US010362767B2

(12) United States Patent
Blaylock

(10) Patent No.: US 10,362,767 B2
(45) Date of Patent: Jul. 30, 2019

(54) RETRACTABLE SAFETY LEASH

(71) Applicant: Ian Blaylock, Monroe, LA (US)

(72) Inventor: Ian Blaylock, Monroe, LA (US)

( * ) Notice: Subject to any disclaimer, the term of this patent is extended or adjusted under 35 U.S.C. 154(b) by 515 days.

(21) Appl. No.: 15/145,279

(22) Filed: May 3, 2016

(65) Prior Publication Data

US 2017/0318788 A1 Nov. 9, 2017

(51) Int. Cl.
*A01K 27/00* (2006.01)
*B65H 75/40* (2006.01)
*A45F 5/00* (2006.01)
*B65H 75/44* (2006.01)

(52) U.S. Cl.
CPC .......... *A01K 27/004* (2013.01); *A45F 5/004* (2013.01); *B65H 75/406* (2013.01); *B65H 75/446* (2013.01); *B65H 75/4431* (2013.01); *A45F 2005/008* (2013.01); *B65H 2701/35* (2013.01)

(58) Field of Classification Search
CPC .......................... A01K 27/003; A01K 27/004
See application file for complete search history.

(56) References Cited

U.S. PATENT DOCUMENTS

| 2,994,300 | A | * | 8/1961 | Grahling | A01K 27/005 |
| | | | | | 119/770 |
| 3,088,438 | A | * | 5/1963 | Oliphant | A01K 27/004 |
| | | | | | 119/770 |
| 3,099,250 | A | * | 7/1963 | Soles, Jr. | A01K 27/005 |
| | | | | | 119/776 |
| 4,501,230 | A | * | 2/1985 | Talo | A01K 27/004 |
| | | | | | 119/796 |
| 4,729,345 | A | * | 3/1988 | Anderson | A01K 27/00 |
| | | | | | 119/770 |
| 4,753,442 | A | * | 6/1988 | Bland | A63B 69/0079 |
| | | | | | 273/330 |
| D337,395 | S | * | 7/1993 | Erlinger | A01K 27/00 |
| | | | | | 119/795 |
| 5,435,273 | A | * | 7/1995 | Landis | A01K 27/005 |
| | | | | | 119/795 |
| 6,095,093 | A | * | 8/2000 | Kisko | A01K 27/003 |
| | | | | | 119/770 |
| 6,886,499 | B2 | * | 5/2005 | Meissner | A01K 27/004 |
| | | | | | 119/789 |
| 6,904,872 | B2 | * | 6/2005 | Muller | A01K 27/004 |
| | | | | | 119/789 |
| 6,932,027 | B1 | * | 8/2005 | Whitney | A01K 27/00 |
| | | | | | 119/770 |
| 7,695,035 | B2 | * | 4/2010 | Sumner | A01K 27/004 |
| | | | | | 294/1.4 |
| 7,886,700 | B2 | * | 2/2011 | Glazer | A01K 27/004 |
| | | | | | 119/796 |
| 8,196,787 | B2 | * | 6/2012 | Strandberg | A45F 5/00 |
| | | | | | 2/16 |
| 8,317,120 | B2 | * | 11/2012 | Bogdahn | A01K 27/004 |
| | | | | | 119/796 |
| 8,322,311 | B2 | * | 12/2012 | Gould | A01K 27/00 |
| | | | | | 119/792 |
| 8,347,824 | B2 | * | 1/2013 | Marshall | A01K 27/005 |
| | | | | | 119/794 |

(Continued)

*Primary Examiner* — Michael H Wang
(74) *Attorney, Agent, or Firm* — Davis & Bujold PLLC; Michael J. Bujold

(57) ABSTRACT

A safety leash comprises a wrist mount body, a cord supported by the wrist mount body, a biased engaged brake for braking the cord, and a brake release.

17 Claims, 12 Drawing Sheets

(56) References Cited

U.S. PATENT DOCUMENTS

| | | | | |
|---|---|---|---|---|
| 9,016,242 | B2* | 4/2015 | Bentz | A01K 27/004 |
| | | | | 119/796 |
| 9,155,287 | B2* | 10/2015 | Messner | A01K 27/004 |
| 9,848,583 | B2* | 12/2017 | Smith | A01K 27/004 |
| 2008/0000432 | A1* | 1/2008 | Alhegelan | A01K 27/004 |
| | | | | 119/796 |
| 2009/0120375 | A1* | 5/2009 | Dyer | A01K 27/004 |
| | | | | 119/769 |
| 2009/0194038 | A1* | 8/2009 | Burgett | A47D 13/086 |
| | | | | 119/770 |
| 2009/0261604 | A1* | 10/2009 | Rodriguez | A01K 27/004 |
| | | | | 294/1.3 |
| 2011/0023794 | A1* | 2/2011 | Smith | A01K 27/001 |
| | | | | 119/794 |
| 2011/0036304 | A1* | 2/2011 | Smith | A01K 27/004 |
| | | | | 119/796 |
| 2011/0314638 | A1* | 12/2011 | Patt | A01K 27/004 |
| | | | | 16/421 |
| 2013/0000566 | A1* | 1/2013 | Berton | A01K 27/004 |
| | | | | 119/796 |
| 2017/0000089 | A1* | 1/2017 | Woods | A01K 27/004 |

\* cited by examiner

RETRACTABLE SAFETY LEASH

BACKGROUND

There is a present need for a leash for dogs and other animals and that normally is of static length, but allows variable length when positively actuated. There is additionally a need for a secure attachment between the human and the dog, especially for children, elderly, and adults of slighter build, to prevent loss of control of the dog if the dog were to dart away.

SUMMARY

Wherefore, it is an object of the present invention to overcome the above mentioned shortcomings and drawbacks associated with the current technology. The present invention is directed to methods and leashes that satisfy the above shortcomings and drawbacks. The methods and leashes comprise a wrist mount body holding a cord, a cord brake normally engaged, and a brake release. According to one embodiment, the safety leash functions counter to current leash technology by using an auto-brake or auto-locking brake to normally prevent an animal from running in an out on a cord.

The present invention also relates to a safety leash comprising a wrist mount body, a cord supported by the wrist mount body, a biased engaged brake for braking the cord; and a brake release. The biased engaged brake may also be described as an auto-locking brake, Alternative embodiments of the present invention include a wrist strap or other wrist attachment securely attach the safety leash to one of a wrist, a hand, and a forearm of a user. The safety leash may include the cord being supported in a spool. The spool may include gear teeth and a spool brake for braking the spool. The spool brake may include a catch to catch a gear on the spool to brake the spool. The gear teeth may be disposed on a first outer circular surface, and the catch may be aligned with a median plane which bisects the spool and is perpendicular to the first outer circular surface.

According to a further embodiment, the spool may include spaced apart first and second gears on respective first and second outer circular surfaces of the spool. The brake may comprise spaced apart first and second catches, where the first and second catches engage a respective gear tooth on respective first and second gears of the spool.

According to another embodiment, the spool may be mounted on a spool mount defining a vertical axis, and one or more rail tracks may be defined in the first and second outer circular surface of the spool which engage respective top and base annular rails to allow rotational motion while maintaining a radially fixed position.

According to still further embodiments, the brake release includes a helve and a counter grip. The helve and counter grip may be elongate and substantially perpendicular. The brake release may be actuated by moving the helve toward the counter grip. The counter grip may be fixed to wrist mount body and the helve may be spring biased away from the counter grip. One or more arms may extend from the helve to the brake. The one or more arms may be of unitary construction with one or more catches of the brake.

According to yet other embodiments, the wrist mount body may mount on a dorsum of a hand or a user. A wrist attachment may securely attach the safety leash to one of a wrist, the hand, and a forearm of the user, the cord may be supported in a spool, and a plane being defined by the spool, may not intersect the hand of the user when the safety leash is mounted on the hand of the user. The brake release may include an elongate helve and an elongate counter grip to actuate the brake release, and the helve and the wrist attachment may be each radially spaced from the spool. A plurality of helve springs may bias the helve away from the counter grip. A spool lock spring may be aligned with a median plane, which bisects the spool along a vertical axis defined by a spool mount.

Various objects, features, aspects, and advantages of the present invention will become more apparent from the following detailed description of preferred embodiments of the invention, along with the accompanying drawings in which like numerals represent like components. The present invention may address one or more of the problems and deficiencies of the current technology discussed above. However, it is contemplated that the invention may prove useful in addressing other problems and deficiencies in a number of technical areas. Therefore the claimed invention should not necessarily be construed as limited to addressing any of the particular problems or deficiencies discussed herein.

BRIEF DESCRIPTION OF THE DRAWINGS

The accompanying drawings, which are incorporated in and constitute a part of the specification, illustrate various embodiments of the invention and together with the general description of the invention given above and the detailed description of the drawings given below, serve to explain the principles of the invention. It is to be appreciated that the accompanying drawings are not necessarily to scale since the emphasis is instead placed on illustrating the principles of the invention. The invention will now be described, by way of example, with reference to the accompanying drawings in which.

DETAILED DESCRIPTION

Figure 1:
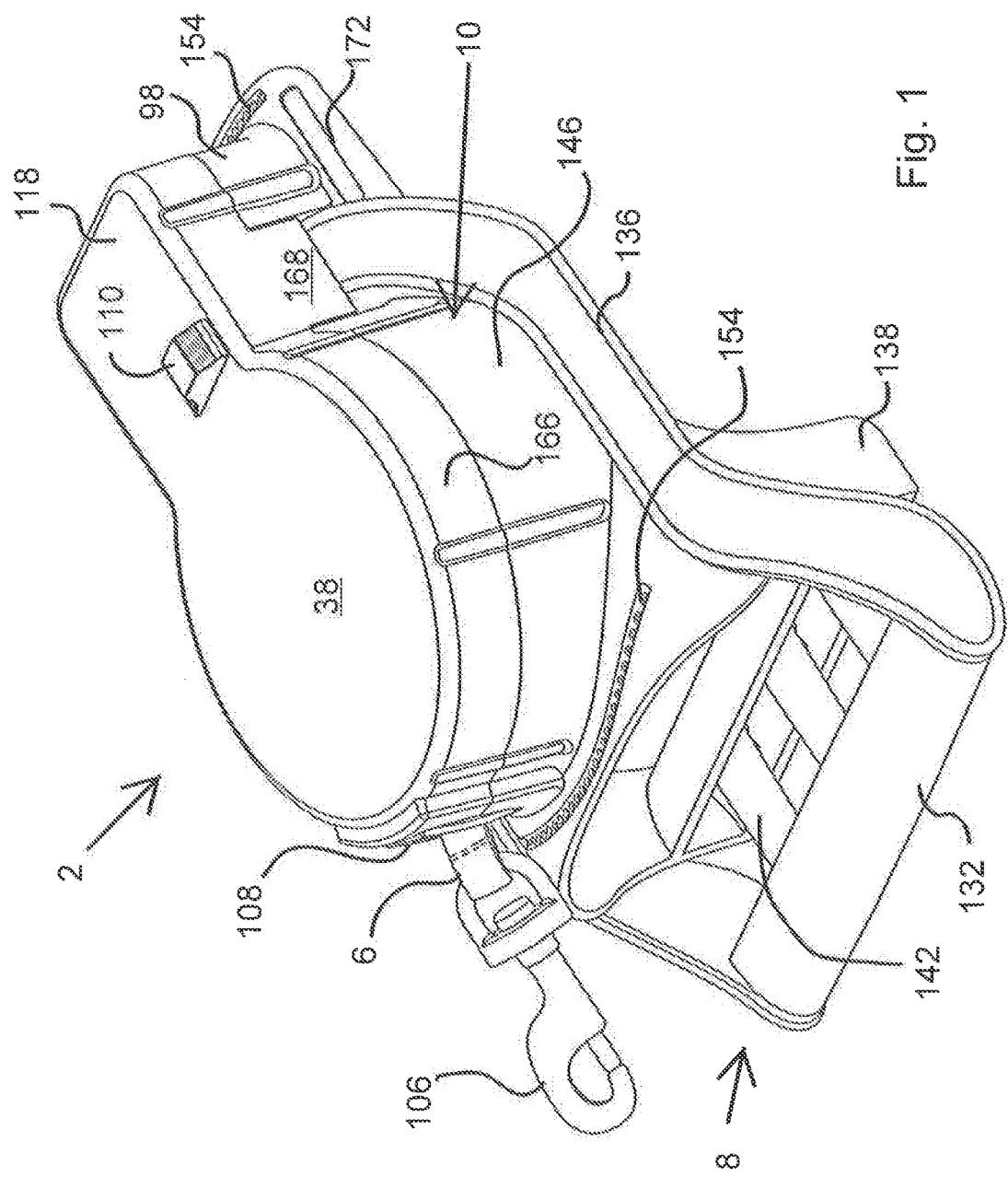
FIG. 1 is an isometric perspective view of a safety leash according to a first embodiment of the presently claimed invention.
Figure 2:
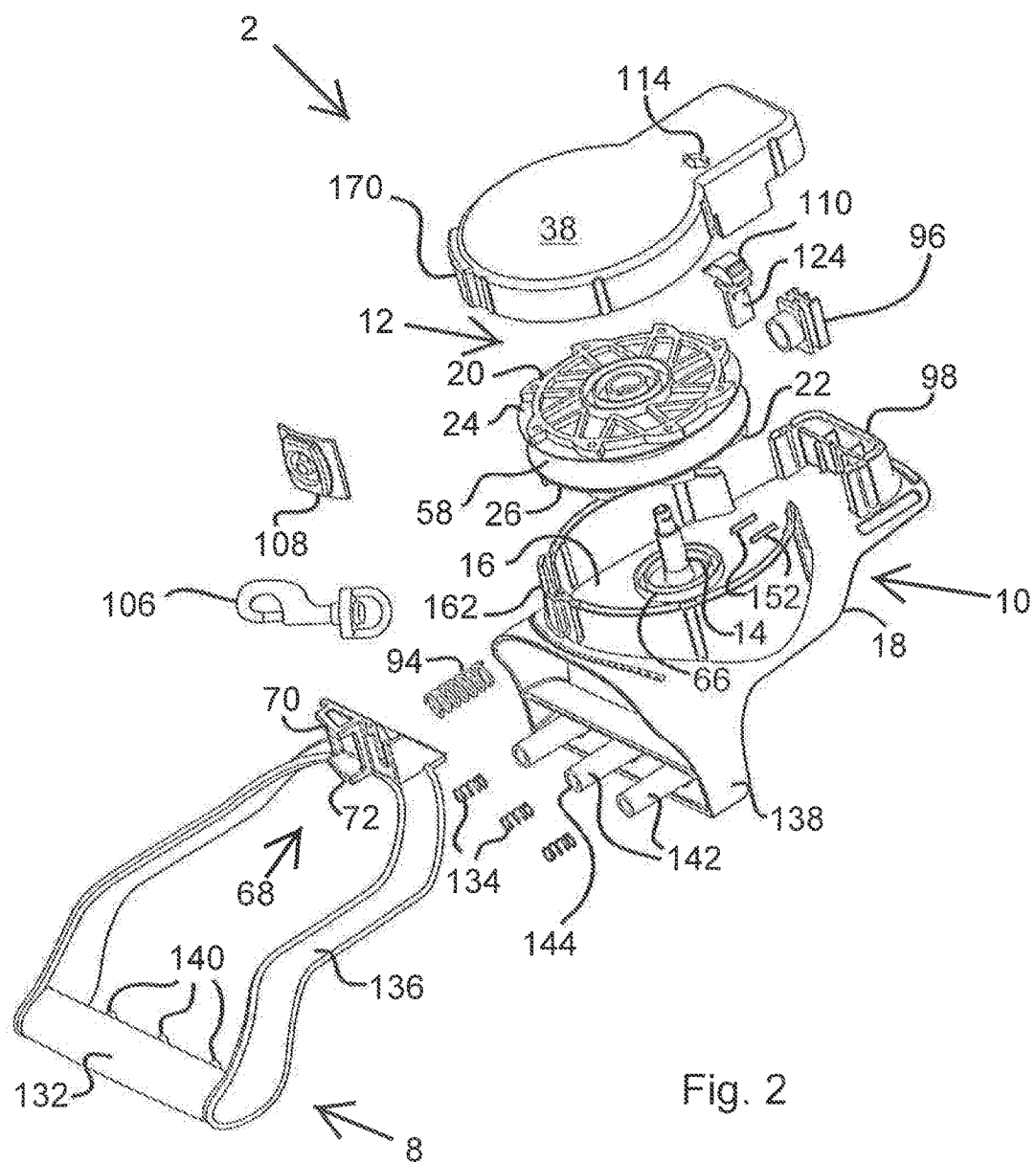
FIG. 2 is an exploded view of the safety leash of FIG. 1, with the cord not shown for clarity.

The present invention will be understood by reference to the following detailed description, which should be read in conjunction with the appended drawings. It is to be appreciated that the following detailed description of various embodiments is by way of example only and is not meant to limit, in any way, the scope of the present invention. In the summary above, in the following detailed description, in the claims below, and in the accompanying drawings, reference is made to particular features (including method steps) of the present invention. It is to be understood that the disclosure of the invention in this specification includes all possible combinations of such particular features, not just those explicitly described. For example, where a particular feature is disclosed in the context of a particular aspect or embodiment of the invention or a particular claim, that feature can also be used, to the extent possible, in combination with and/or in the context of other particular aspects and embodiments of the invention, and in the invention generally. The term "comprises" and grammatical equivalents thereof are used herein to mean that other components, ingredients, steps, etc. are optionally present. For example, an article "comprising" (or "which comprises") components A, B, and C can consist of (i.e., contain only) components A, B, and C, or can contain not only components A, B, and C but also one or more other components. Where reference is made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

The term "at least" followed by a number is used herein to denote the start of a range beginning with that number (which may be a range having an upper limit or no upper limit, depending on the variable being defined). For example "at least 1" means 1 or more than 1. The term "at most" followed by a number is used herein to denote the end of a range ending with that number (which may be a range having 1 or 0 as its lower limit, or a range having no lower limit, depending upon the variable being defined). For example, "at most 4" means 4 or less than 4, and "at most 40% means 40% or less than 40%. When, in this specification, a range is given as "(a first number) to (a second number)" or "(a first number)-(a second number)," this means a range whose lower limit is the first number and whose upper limit is the second number. For example, 25 to 100 mm means a range whose lower limit is 25 mm, and whose upper limit is 100 mm. The embodiments set forth the below represent the necessary information to enable those skilled in the art to practice the invention and illustrate the best mode of practicing the invention. In addition, the invention does not require that all the advantageous features and all the advantages need to be incorporated into every embodiment of the invention.

Turning now to FIGS. 1-4, a brief description concerning the various components of the present invention will now be briefly discussed. As can be seen in this embodiment, the safety leash 2 includes a brake 4, a cord 6, a brake release 8, and a wrist mount body 10.

Figure 10:
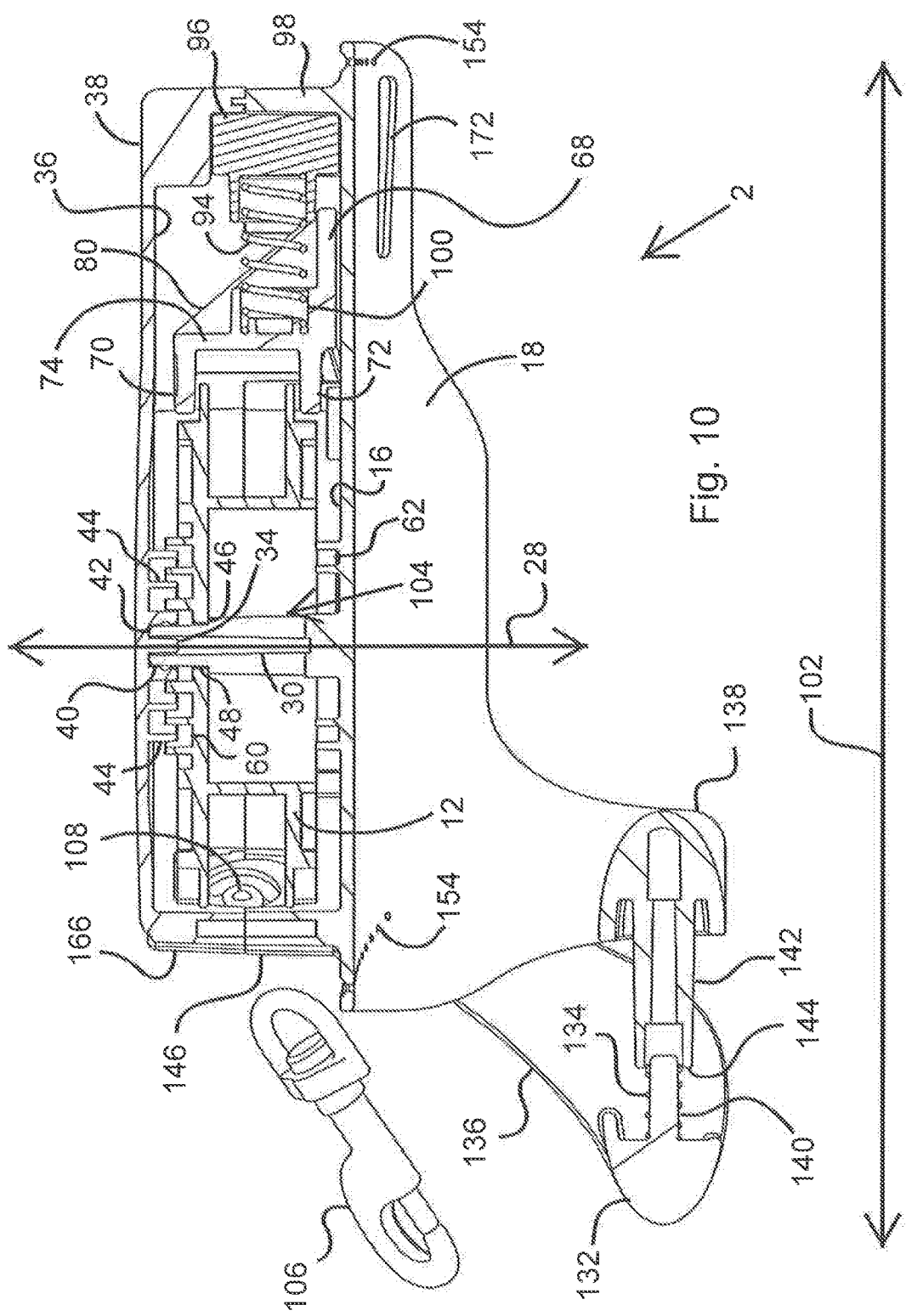
FIG. 10 is a sectional view of the safety leash of FIG. 9 in the direction of the arrows along the plane marked A.

BRAKE: The brake 4 in the embodiment shown comprises a spool 12 mounted on a spool mount 14. The spool mount 14 preferably extends substantially orthogonally from an upper surface 16 of a base 18 of the wrist mount body 10 through the spool and preferably extending out and above the spool. The spool 12 has first and second gears 20, 22 positioned on respective opposing first and second outer circular surfaces 24, 26, shown arranged orthogonal to a vertical axis 28 defined by the spool mount 14. The spool mount 14 is preferably of unitary construction with the base 10. The upper portion 30 of the spool mount 14 has an upper bore 32 that accepts and couples with a shank 34 projecting downward from an inner surface 36 of the top cover 38 (see FIG. 10). The radially outer edge 40 of the upper portion 30 of the spool mount fits into a spool mount spacing 42 between the shank 34 and a radially inner most top annular rail 44 projecting downward from the top cover inner surface 36. The spool mount 14 preferably has a narrowing ledge 46 upon which the radially inner edge 48 of the first outer circular surface 24. The vertical axis 26 preferably intersects from top to bottom, a dorsum of the hand 50 in either a mid-portion of the dorsum or in an area close to the wrist 52, the area in the middle of the wrist 52, or an area of forearm 54 adjacent to the wrist 52 of the user 56, allowing for greater control and management by the safety leash user 56 of torque forces produced by the safety leash 2.

The first and second gears 20, 22 are spaced from one another by a cord track 58. The cord track is a preferably recessed area for the cord 6 to wind about and unwind from. The first and second gears 20, 22 have respective first and second rail tracks 60, 62 defined in their respective outer surfaces 24, 26 that mate with respective top and base annular rails 44, 66. The top annular rails 44 are located on the inner or lower surface 34 of the top cover 38. The base annular rails 66 are located on the inner or upper surface 16 of the base 18, circumscribing the spool mount 14. The annular rails 44. 66 and the mating rail tracks 60, 62 maintain the spool 12 in an axially stationary position during spool rotation about the vertical axis 28.

The first and second gears 20, 22 releasably engage with a mating spool lock 68 to prevent rotation of the spool 12. The spool lock 68 has a first catch 70 that interacts with the first gear 20 and a vertically axially spaced second catch 72 that interacts with the second gear 22. The first and the second catch 70, 72 are joined by a frame 74. The frame 74 has a preferably planar wall 76 supported by first and second brackets 78, 80, preferably extending parallel to one another and perpendicular to a plane defined by the wall 76.

The first and second gears 20, 22 have gear teeth 82 with an engaging gear face 84 and a sliding gear face 86. The engaging gear face 82 engages with an engaging lock face 88 of the spool lock 68 to brake to the spool 12 and prevent spool 12 rotation in an unwinding direction. The sliding gear face 86 provides reduced friction between the gear tooth 82 and a sliding lock face 90 of the spool lock 68 to promote easy motion of the spool lock 68 into a gear gap 92 between two adjacent gear teeth 82 on a common gear 20, 22 when engaging the spool lock 68. While the shape of the gear teeth 82 and catches 70, 72 described are preferred, other designs are envisioned as well The spool lock 68 is spring biased with a spool lock spring 94 to normally engage the spool lock 68 with the spool 12. The spool lock spring 94 is retained on a first end, facing away from the spool 12, by a seat spring guide 96. The seat spring guide 96 is retained by a seat portion 98 of the base 18. The second end of the spool lock spring 94, facing the spool 12, extends through a brake spring guide 100 to bias the spool lock catches 70, 72 into respective gear gaps 92 on the gears 20, 22 of the spool 12. The spool lock spring 94 and the engaging faces 88 of the first and second catches 70, 72 are substantially aligned with a median plan 102 (see FIGS. 6, 9). This allows for much of the force of strong tug on the cord 6—from a lurching dog for example—to be transferred from the cord 6 to the base 18 at a location over the central area of the wrist 52 or forearm 54, providing more security and strength to the user.

Figure 11:
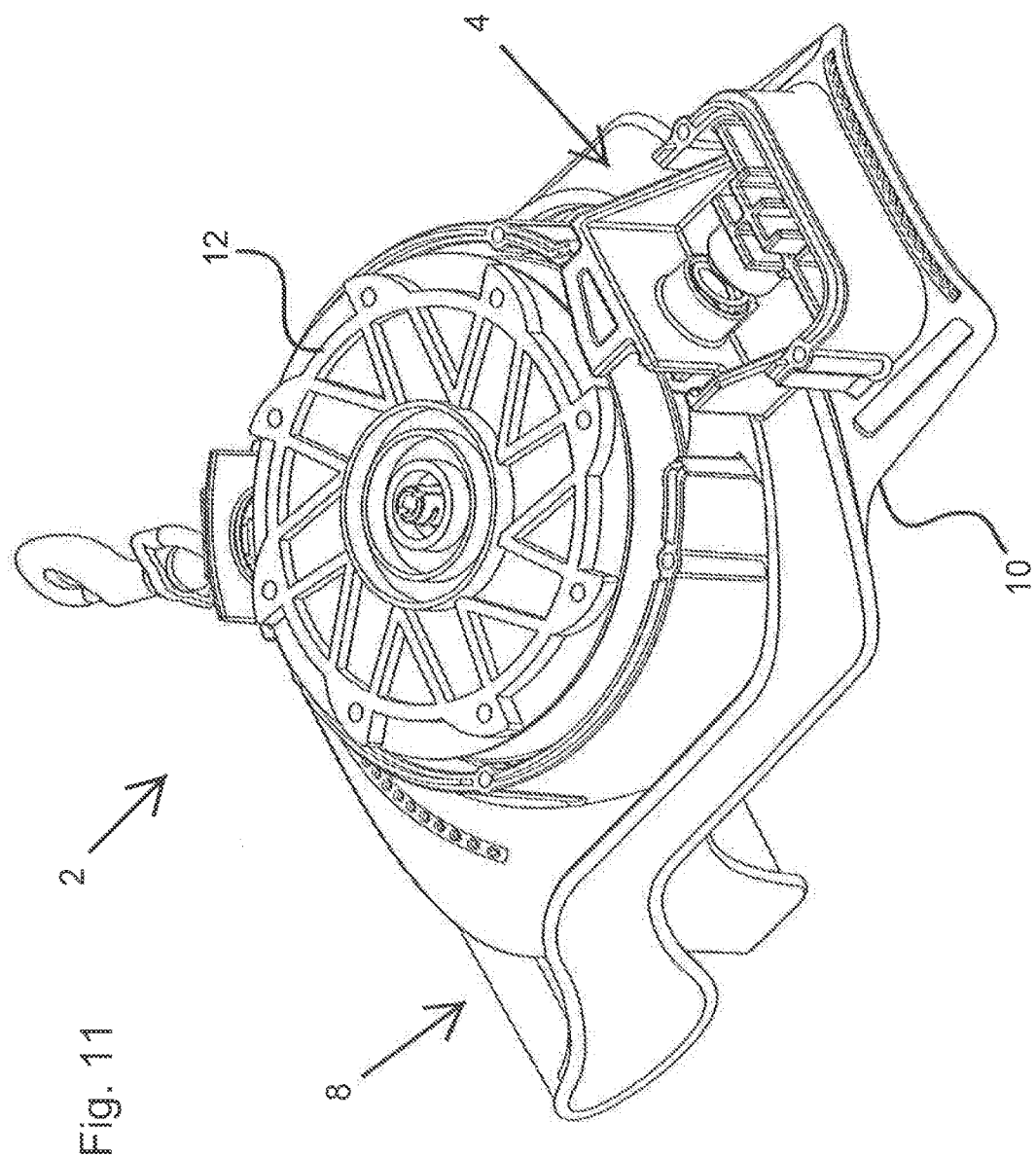
FIG. 11 is a perspective view of the safety leash of FIG. 3 with the brake disengaged and with the top cover and the lock retainer not shown for clarity.
Figure 12:
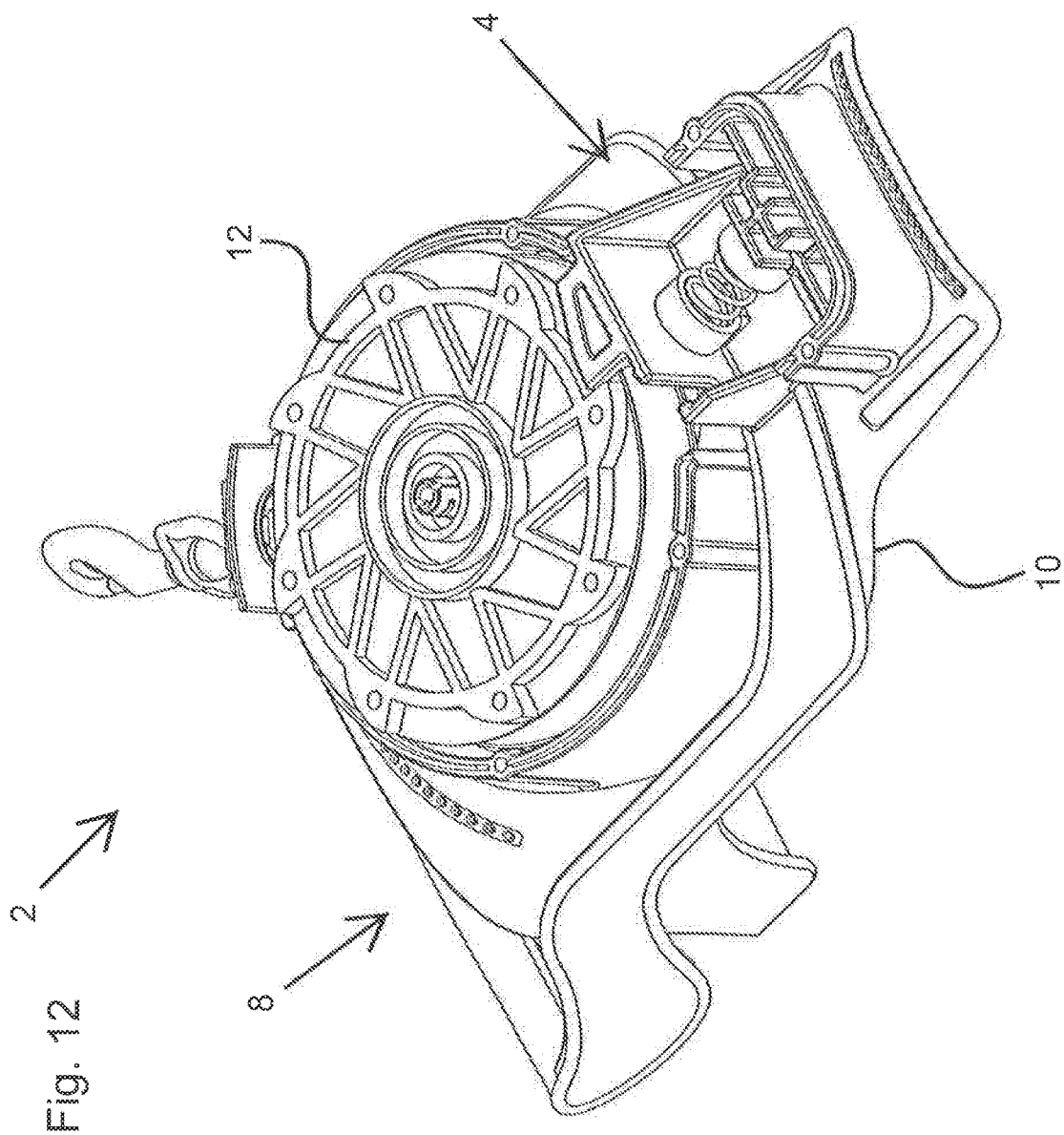
FIG. 12 is a perspective view of the safety leash of FIG. 1, with the brake engaged and with the top cover and the lock retainer not shown for clarity.

In operation, the cord 6 winds and unwinds about the cord track 58 of the spool 12. The spool 12 is spring biased by a spool winding spring 104 to turn in a winding direction, clockwise in FIGS. 2 and 3. The spool winding spring 104 is preferably a mainspring, but could be another torsion or other type of spring or elastic device that provides the predictable winding function. When the brake 4 is in the spring biased engaged position (see FIGS. 7, 8, 10, 12), with the spool lock 68 extending into the gear gap 92, the spool 12 is prevented from winding in the winding direction or unwinding in the unwinding direction. The unwinding direction being counterclockwise in FIGS. 2 and 3. When the brake 4 is in the disengaged position (see FIGS. 3, 4, 11), the spool winding spring 104 will wind up the cord 6 in the cord track 58 on the spool 12 until the cord 6 fully winds and a cord clip 106 abuts a cord guide 108 in the wrist mount body 10, or until an additional force applies an equal or greater force in the unwinding direction on the cord 6—for example, the cord 6 pulling taunt on a stationary dog or a dog walking away from the user 56 respectively. It is to anticipated that the winding direction of the safety leash 2 could be designed as counter-clockwise, and appropriate changes made for the different winding direction and the safety leash 2 still be within the presently claimed invention.

Figure 3:
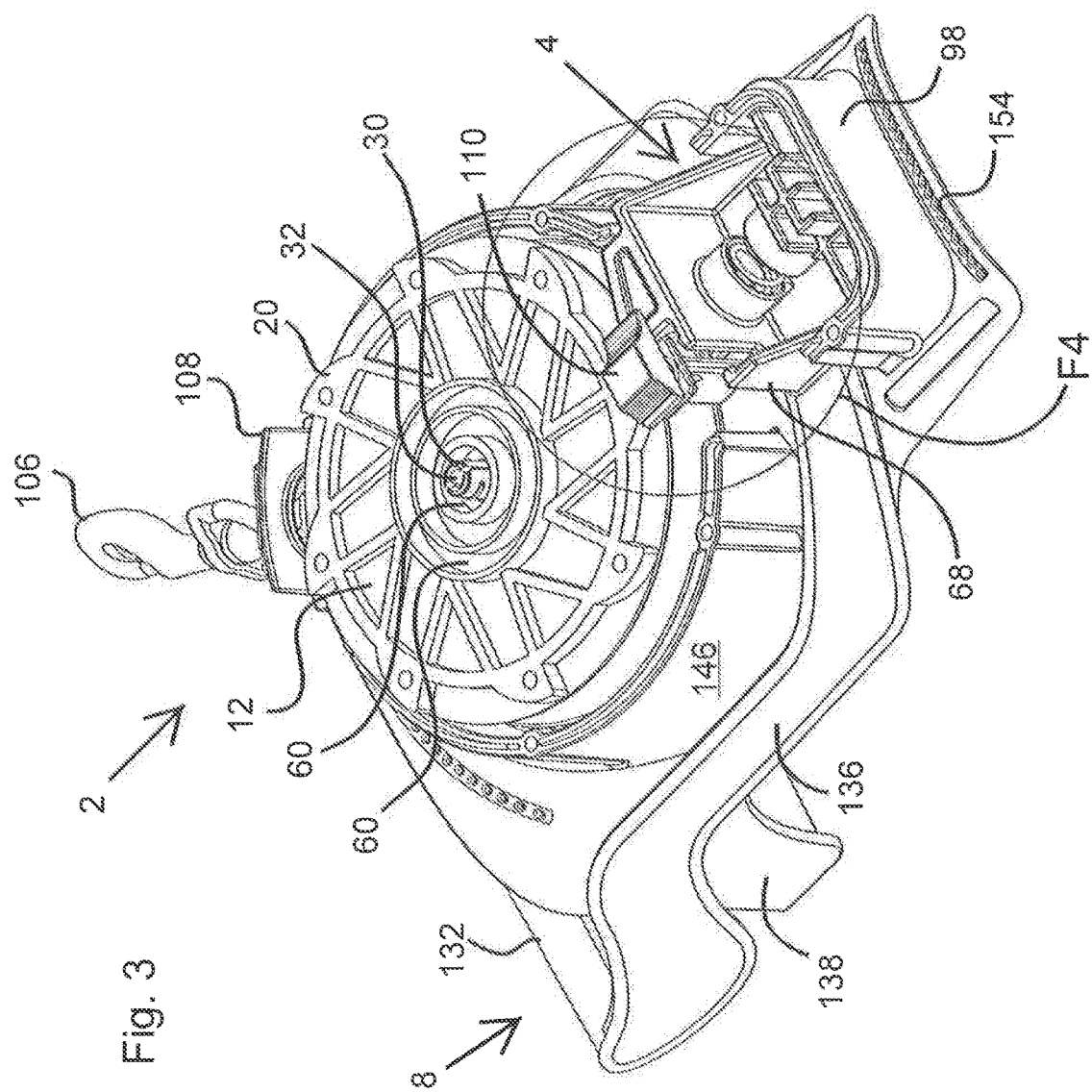
FIG. 3 is a partial perspective view of the safety leash of FIG. 1, with the top cover not shown for clarity and with the retainer in an unblocked position.
Figure 4:
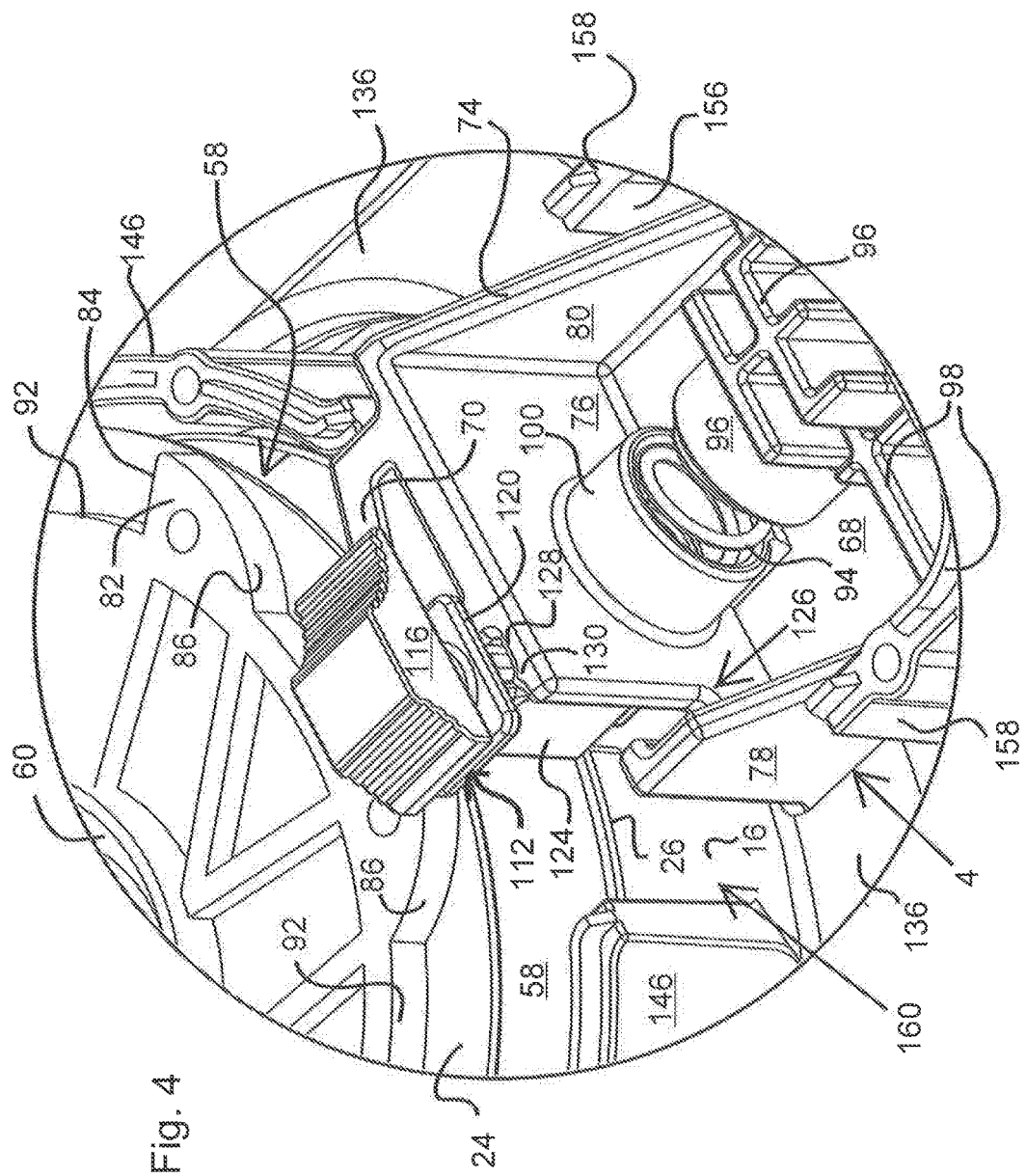
FIG. 4 is close up view of the area of safety leash of FIG. 3 inscribed in the circle marked F4, but with the retainer in an blocked position.

RETAINER: To maintain the spool lock 68 in the open, disengaged position, a lock retainer 110 is provided. A neck 112 of the retainer 110 extends through a retainer gap 114 in the top cover 38 of the wrist mount body 10, with an outer brace 116 extending over an outer surface 118 of the top cover 38 and an inner brace 120 extending over the inner surface 36 of the top cover 38. The neck 112 is preferably radially recessed in from the outer brace 116 and the inner brace 120. The neck 112 is sized to slide in the retainer gap 114 parallel to a transverse plane 122 (see FIG. 6) from an unblocked position (see FIG. 3) to a blocked position (see FIG. 4) and back. The outer and inner braces 116, 120 are sized to maintain the retainer 110 in a same position along the vertical axis 28 as the retainer 110 moves from the unblocked position to the blocked position and back. A preferably elongate pillar 124 extends downward toward the base 18 (as seen in FIGS. 3 and 4, for example). When the retainer 110 is in the unblocked position, as the spool lock 68 moves from the disengaged to the engaged position, the spool lock 68 bypasses the stationary retainer 110 via a retainer pass-through 126 provided in the wall 76 of the spool lock frame 74. The retainer pass-through 126 is aligned with the retainer pillar 124 when the retainer is in the unblocked position and provides sufficient clearance to for the spool lock 68 to bypass the retainer pillar 124 allowing the spool lock 68 to move into the engaged position.

When the retainer 110 is moved into the blocked position (see FIG. 4), it fits into a retainer notch 128 extending from the spool lock frame wall 76, preferably with an extension or detent 130 to aid in retaining the retainer 110 in the retainer notch 128. As the spool lock 68 is biased toward engagement, the retainer notch 128 impacts the retainer pillar 124 and transfers force to the retainer 110. The neck 112 of the retainer 110 receives the force and is pressed against the edge of the top cover 38 forming the retainer gap 114, and thus resisting further motion of the retainer 110 or the spool lock 68 in the engaging direction. The detent 130 helps maintain the retainer 110 in the blocked position by requiring an initially increased amount of force to slide the retainer 110 from the blocked position to the unblocked position, and moving the detent 130 and spool lock 68 against the spring bias 94. Once free of the detent 130, the retainer 110 will preferably slide freely the remainder of the path toward the fully unblocked position (aligned with the retainer pass-through 126), BRAKE RELEASE: The brake release 8 includes a helve 132, helve springs 134, and a one or more arms 136 connecting the helve 132 with the spool lock 68. Preferably the helve 132, the arms 136, and the spool lock 68 all are at least partially of unitary construction or otherwise fixedly connected. Alternatively, the spool lock 68 could be functionally connected with the helve by 132 means of gears, levers, pulleys, or other methods of transmitting motion and force (not shown). The unitary construction between the helve 132, the handles 136, and the spool lock 68 shown in the Figures is preferred because it offers increased robustness in force transfer and increased reliability because of fewer moving parts. The brake release 8 is biased in the deactivated position (see FIGS. 7, 8, 10, 12) as the spool lock is concurrently biased in the engaged position. In addition to the spool lock spring, through the arms 136, normally biasing the brake release 8 into the deactivated position, the one or more helve springs 134 also bias the brake release 8 into the deactivated position, thereby also providing more force biasing the spool lock 68 into the engaged position. The helve springs 134 are preferably aligned with or parallel to the median plane 102 for maximum force transfer (see FIG. 6, 10). The helve springs 134 are retained on a first end, facing away from a counter grip 138 portion of the wrist mount body 10, by respectively axially aligned helve spring posts 140 extending from the helve 132 toward the counter grip 138. The helve spring posts 140 extend through and inside the circumference their respective helve springs 134 with a clearance or transition fit and preferably with a sliding fit. The counter grip 138 preferably has a respective number of helve spring guides 142 axially aligned with the helve springs 134 and helve spring posts 140. The helve spring guides 142 are preferably sized such that a leading edge 144 has an overlapping circumference as a circumference of at the helve springs 134. In this embodiment, the helve spring posts 140 will pass through the helve springs 134 and into the helve spring guides 142, but the second end of the helve springs, facing the counter grip 138, will be compressed against the leading edge 144 of the helve spring guides 142 (see FIGS. 7 and 10). This allows for an advantageous fit between the helve spring posts 140 and the helve spring guides 142 to better transfer axial and transverse forces from the counter grip 138 to the helve 132 in operation of the safety leash 2.

According to an additional embodiment (not shown), the second end of the helve springs 134, facing counter grip 138, extend through the respective helve spring guide 142. When assembled, the helve spring posts 140 would extend through the helve springs 134 and into the helve spring guides 142. This would allow for longer and thinner helve springs 134, but would decrease the surface area contact between the helve spring posts 140 and the helve spring guides 142.

Figure 5:
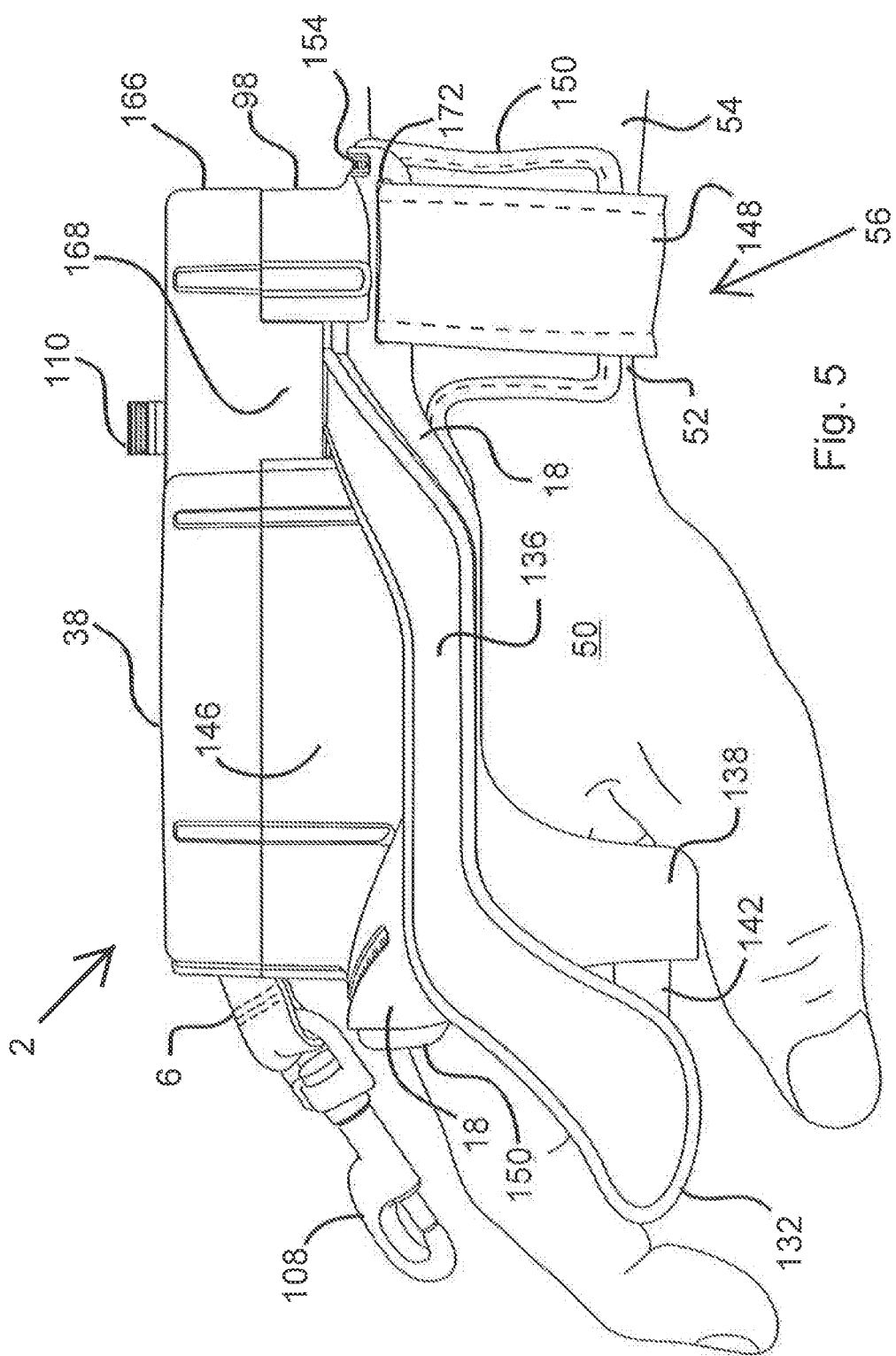
FIG. 5 is a side plan view of a second embodiment of safety leash according to the presently claimed invention mounted on a user's hand and wrist.

As shown in FIG. 5, the helve 132 and the counter grip 138 are designed to allow the user 56 to comfortably position his or her hand 50 into the safety leash 2 with the helve 132 and the counter grip 138 providing two elongate (preferably cylindrical) surfaces preferably in the medial palmer, palmer, and/or proximal/middle digital region of the hand 50 to manage sudden forces applied to the cord 6, and control the leashed animal with a reduced amount of strength expended by the user 56. As described above, when the user 56 desires to activate the brake release 8 and disengage the spool lock 68, the user 56 squeezes the helve 132 toward the counter grip 138, pulling the helve 132 against the helve spring 134 bias. This causes the arms 136 to transmit the lateral motion and force to the spool lock 68, pulling the spool lock 68 back against the spool lock spring 94 and moving the first and second catches 70, 72 of the spool lock 68 away from the spool 12 and out of their respective gear gaps 92.

This allows the spool 12 to rotate in either a winding or an unwinding direction, depending on the unwinding/pulling force being exerted on the cord 6 and the strength of the spool winding spring 104. Further, because of the placement of the helve 132 extending across all four fingers in the proximal/middle digital region of the users hand 50, and the counter grip abutting the strong thenar eminence, when the user 56 desires to actuate the break release 8 and disengage the spool lock 68, little strength and energy is required from the user 56.

According to further embodiments, just one or more helve springs 134 or just one spool lock spring 94 could be provided to sufficiently bias both the spool lock 68 and the brake release 8. However, the embodiments shown in the Figures are preferred as they allow for smaller springs 94, 134 to collectively provide the total bias force. Additionally, with the plurality of springs 94, 134 in a plurality of locations 96, 100, 140, 142, smother motion is provided as is redundancy such that in the case of a failure of any one spring 94, 134, the safety leash 2 will continue to function until the user 56 is able to get his or her animal back to an secure, leash-free location. Further, the spool lock spring 94 and helve springs 134 shown are compression coil springs, but the safety leash 2 could be modified to use tension coil springs, or other tension, compression, torsion or other springs and elastic devices.

WRIST MOUNT BODY: The wrist mount body 10 is comprised of the base 18, the seat 98, the spool mount 14, the counter grip 138, a lower cover 146, the top cover 38, and a wrist strap 148 and pad 150. The base 18, the seat 98, the spool mount 14, the counter grip 138, and the lower cover 148 are all preferably unitary of construction.

Figure 9:
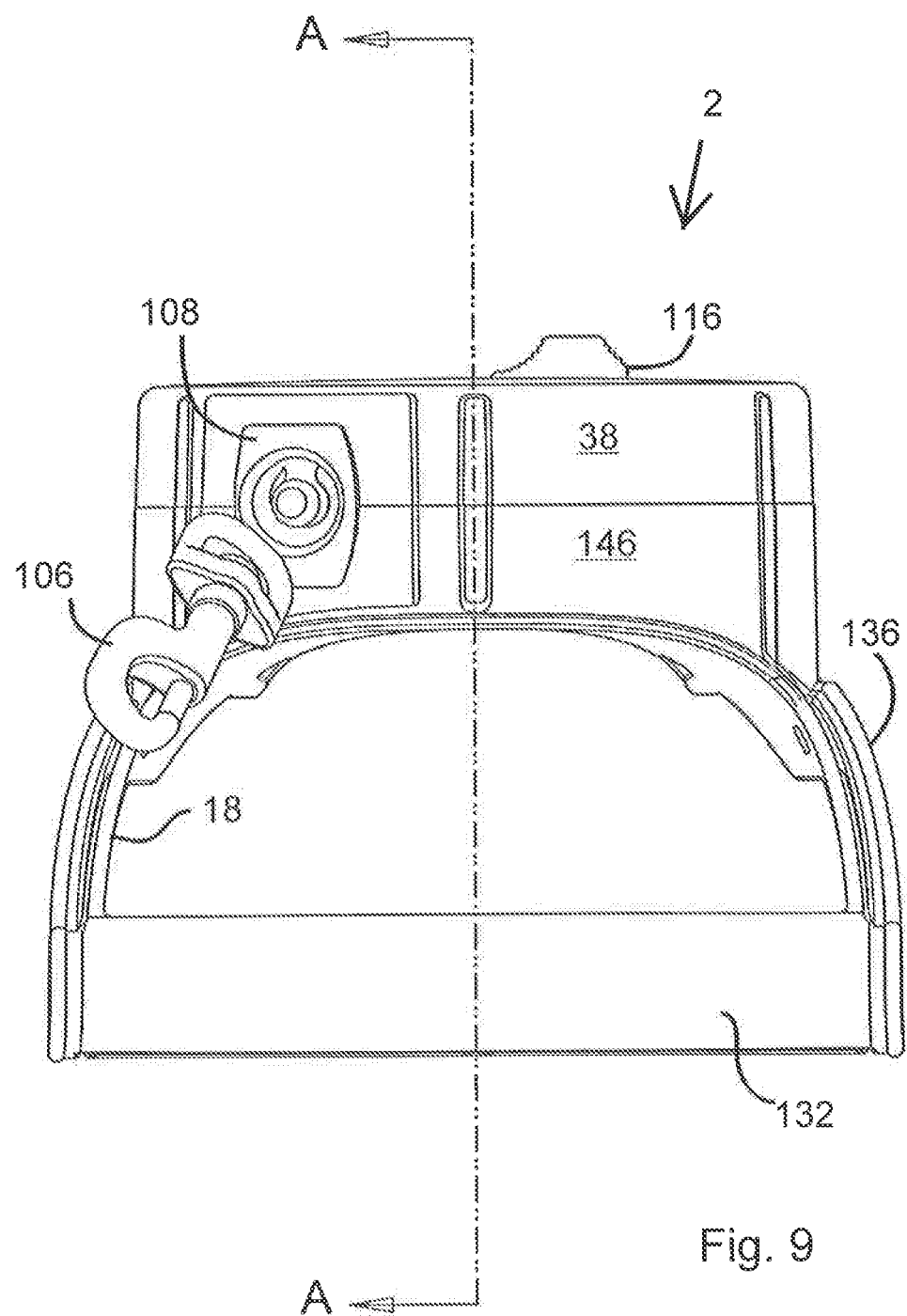
FIG. 9 is a front plan view of the safety leash of FIG. 1, with the cord not shown for clarity.

The base 18 supports the other members of the wrist mount body 10 and, as shown in FIGS. 5 and 9, is generally arcuate to accept and substantially envelope the dorsal portion of a human hand 50. This shape provides increased surface area to transfer forces between the safety leash 2 and the user 56, minimizing the amount of energy required to maintain control of the leashed pet, while at the same time allowing a large amount of freedom of movement for the user's hand 50. The base 18 generally follows the contour of the arms 136 to provide for a smaller profile for more user 56 convenience and for better support for the arms 136. The base 18 also helps provide lateral support for the spool lock 68 with a pair of base channel rails 152. The base channel rails 152 guide the spool lock 68 in a linear fashion along the median plane 102 as the spool lock 68 moves from an engaged position to a disengaged position and back.

The base 18 may also be provided with ventilation holes 154 to increase air circulation to and from the hand 50, wrist 52, and forearm 54 of the user 56. Though the ventilation holes 154 in the Figures are just shown first, along a distal portion of the base 18 in an area where the outer surface of the lower cover 146 meets the base 18 and second, the proximal edge of the base adjacent to the seat 98, the ventilation holes 154 could be in alternate or additional locations, and indeed, could be spread throughout the base 18. According to further embodiments, the ventilation holes may also be used to attach pads 150 and/or wrist attachments/straps 148 via sewing or other methods.

Figure 7:
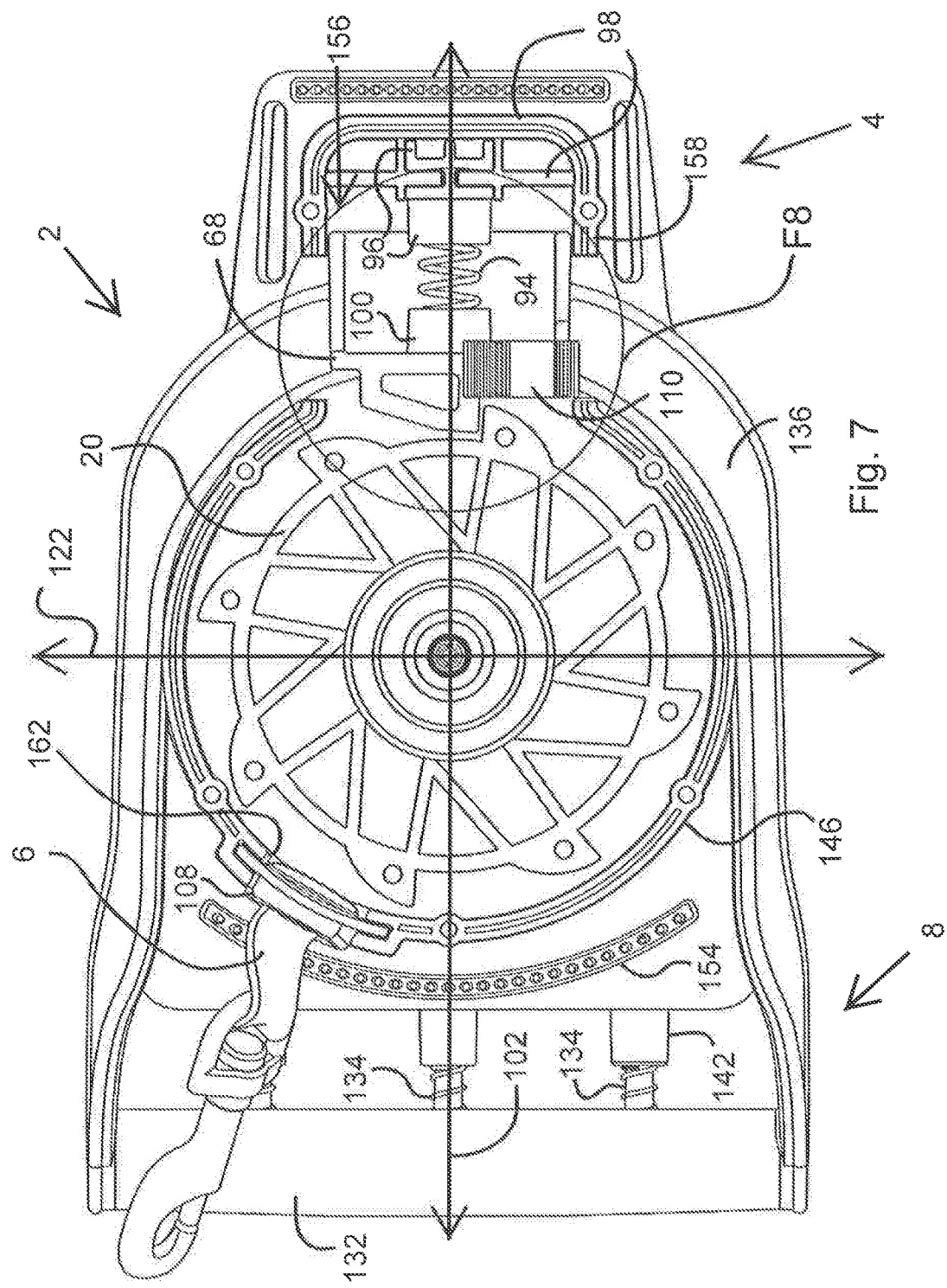
FIG. 7 is a top plan view of the safety leash of FIG. 1, with the top cover not shown for clarity.
Figure 8:
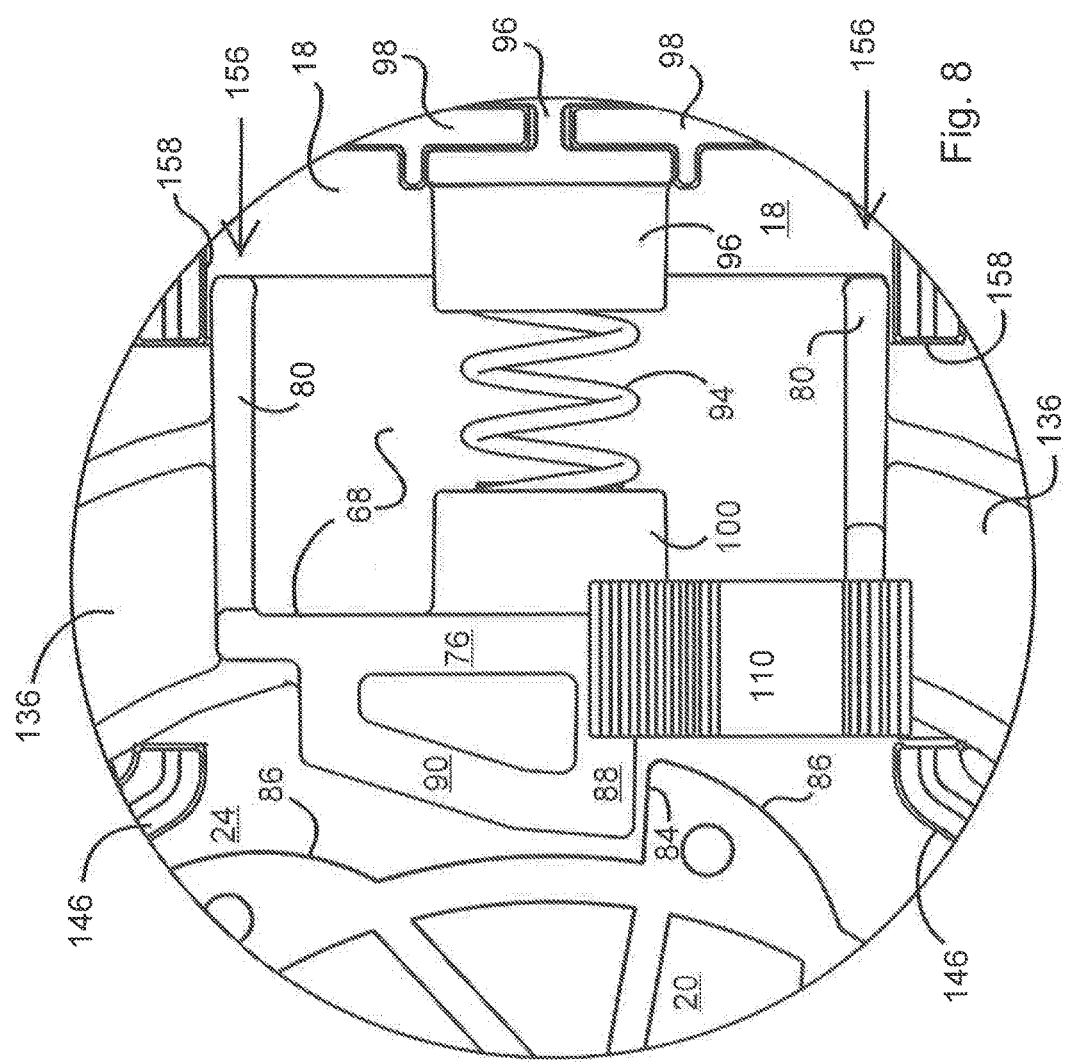
FIG. 8 is close up view of the area of safety leash of FIG. 7 inscribed in the circle marked F8.

The seat 98 is located at a proximal position of the base 18 and provides part of the housing for the spool lock 68, the retainer 110, the seat spring guide 96, and the arms 136 attached to the spool lock 68. The seat 98 is open on either side of the median plane 102 to allow the arms 136 to pass through, and has enough clearance to allow the arms 136 to move forward and back ward (or distally and proximally respectively), as the spool lock 68 engages and disengages from the spool gears 20, 22. The seat spring guide 96 is preferably directly mounted in the seat 98, whereby the seat 98 provides stationary support for the spool lock spring 94 to press against. As shown in FIG. 7, the seat 96 also provides structural support for the spool lock 68 when engaging and disengaging and when holding a braking of the spool 12 and cord 6. A channel 156 is preferably provided the distal portion of the seat with two support fins 158 for the spool lock 68 to move smoothly into and out of engagement with the spool gears 20, 22. The seat channel 156 and support fins 158 also provide structural stationary reinforcement when the spool lock 68 engages with the spool 12 to brake the cord 8. When the engaging gear face 84 engages with the engaging lock face 88, f the cord 6 is pulled in the unwinding direction, rotational force is exerted on the spool lock 68 in an opposite direction of the unwinding spool 12 (clockwise in FIG. 7). The two support fins 158 of the seat 98 resist the torque and maintain the spool lock 68 substantially stationary in the seat 98 section of the wrist mount body 10, transferring to force from the cord 6 through the spool 12, through the spool lock 68, and into the wrist mount body 10.

As described above, the spool mount 14 extends upward from the base 18 and preferably carries the spool winding spring 104, thus providing the stationary support for the biasing spring force winding the spool 12.

As described above, the counter grip 138 interacts with the helve 132 to assist in the functioning of the brake release 8 and provides a generous and secure hand hold to control the safety leash 2 and the leashed pet.

The lower cover 146 is a substantially cylindrical shaped section with a proximal open portion 160 in the lower cover 146 to allow passage of the spool lock 68. The radius of the lower cover 146 is comparable but larger than the spool 12, for example, 10% larger, A lower cord opening 162 in the lower cover is provided to mount the cord guide 108, through which the cord 6 passes into and out of the safety leash device 2. The cord guide 108 is mounted toward a proximal portion of the lower cover 146, preferably between the median plane 102 and a tangential location of the transversal plane 122. The tangential location 164 is where if the cord 6 is being unwound tangentially to the spool, without the covers 38, 146 blocking, the cord 6 would be parallel with the median plane 102. The tangential location 164 is best for minimizing friction on the cord 6 between the cord 6 and the cord guide 108 if the cord 6 is being pulled out in a direction parallel to the median plane 102 (what a user would perceive as "straight ahead") and thereby transferring most of the force onto the spool 12. However, at the tangential location 164 when the cord 6 is pulled in a direction other than straight ahead, downward for example, the cord could 6 pull on the safety leash 2 in a manner to cause the safety leash 2 to try to rotate about the wrist 52 of the user from top to bottom (that is, from dorsal to palmer). Conversely, if the cord guide 108 was placed in line with the median plane 102, this would be the location to best handle the cord 6 being pulled in any direction, because the safety leash 2 would naturally resist rotation about the wrist (top to bottom) no matter what direction the cord 6 was pulled from this point. The disadvantage is that placing the cord guide 108 along the median plane 102 would cause the cord 6 to exit the cord guide 108 at a right angle to a natural unwinding tangent line, which would cause greater wear and tear on the cord 6 with each use. The placement shown in FIG. 6 is a balanced approach to greater stability of the safety leash 2 on the one hand and smother functioning with less wear and tear on the other hand, though the balance preferably weighing more toward stability, as shown with the placement being closer to the median line 102 than the tangential location 164.

The top cover 38 fits over and attaches to the lower cover 146 and seat 98, substantially flush with each, as shown in FIGS. 5 and 9. Along the perimeter 166 of the top cover, at the location analogous to a gap along the base 18 between the lower cover 146 and the seat 98, buttresses 168 extend downward from the top cover 38. The buttresses 168 retain the arms 136 from moving up away from the base 18, and thereby increase the stability of the spool lock 68. Also, by the top cover 38 structurally connecting the seat 98 to the lower cover 146, the seat 98 is reinforced and much more robust to support the spool lock 68. As shown in FIG. 9, the cord guide 108 is mounted in the top cover 38 in a top cord opening 170 circumferentially aligned with the lower cord opening 162 location in the lower cover 146.

Figure 6:
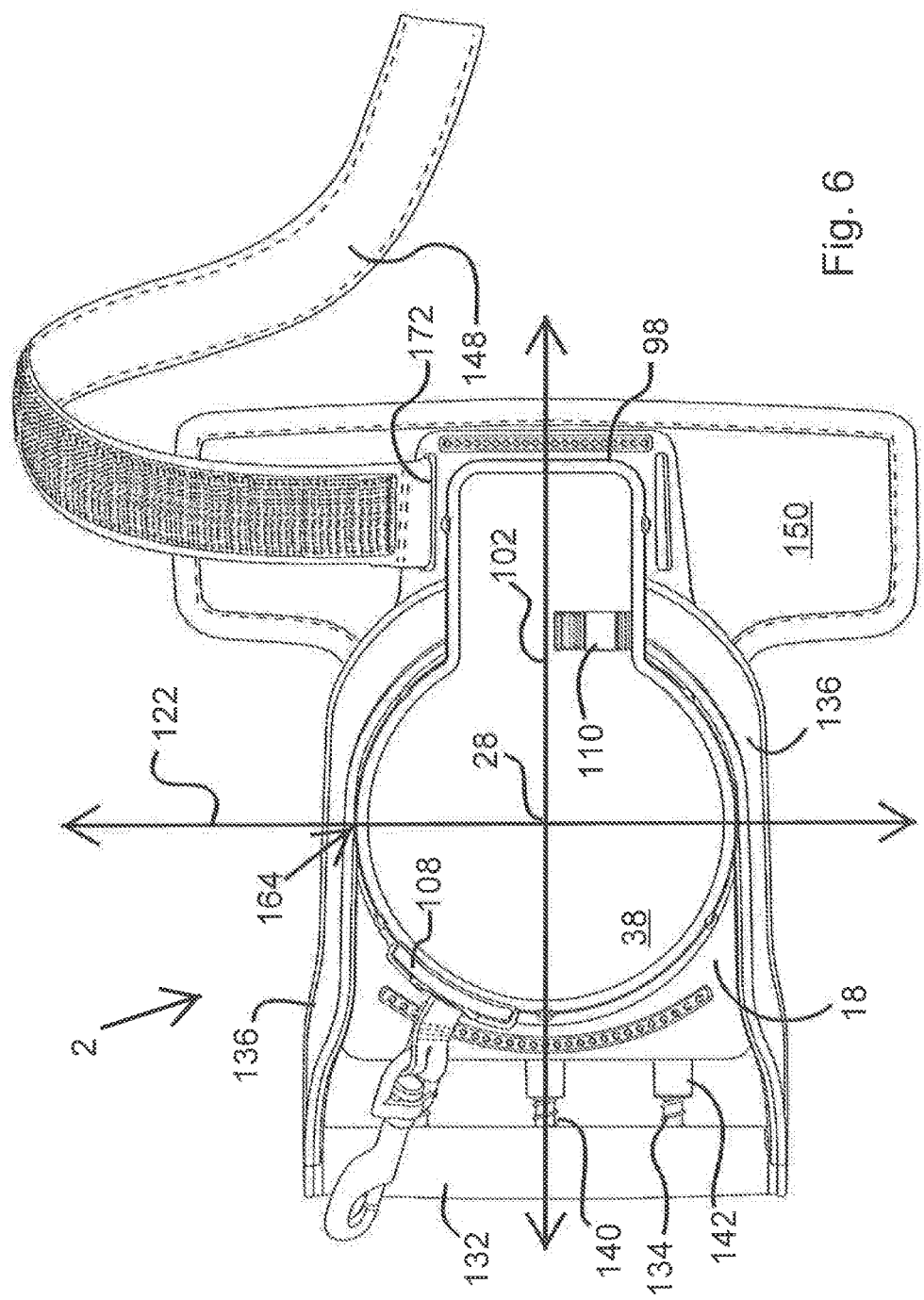
FIG. 6 is a top plan view of the safety leash of FIG. 5 not mounted on a user's hand and wrist.

As shown in FIGS. 5 and 6, a wrist strap 148 and one or more pads 150 are preferably included in the safety leash 2, both preferably made of a flexible fabric material, including natural materials, like cotton, silk, wool, linen, leather, and rubber, synthetic materials, like including polyester, acrylic, nylon, rayon, acetate, spandex, lastex, orlon and Kevlar, and blends of natural and synthetic materials. In the embodiment shown, the wrist strap and pads are separate, but they could be one piece. The wrist strap 148 wrist attachment preferably attaches to the base 18 at strap attachment slots 172 located on the base 18 proximately to the spool 12 and the catches 70, 72. The wrist strap 148 wraps around the wrist 52 or forearm 54 of the user 56 and secures the safety leash 2 from movement in all directions with no energy exerted by the user. The wrist strap 148 preferably uses a Velcro attachment to secure the strap to itself. While the wrist strap 148 depicted is the preferred method of attaching the safety leash 2 to the user 56, other wrist attachments and methods of securing the wrist attachments are envisioned including belts and buckles, metal or hard plastic straps, claps, butterfly claps, elastic, clips, and other methods of physically securing the wrist attachment. The pad 150 is attached to the underside of the base 18, to provide comfort and a more secure connection between the base 18 and the hand/wrist/forearm 50, 52, 54 of the user 56.

Once the user 56 has strapped on the safety leash 2, and adjusted the cord 6 to an appropriate length of lead for the user's pet, the user 56 can run open handed with the pet at a fixed length of lead. If the pet bolts or tugs suddenly, because of the location of the helve 132 and the counter grip 138, the user 56 can easily maintain control of the safety leash 2 and the pet, without moving a finger. Additionally, the safety leash 2 provides three locations of user 56 leash force control 1) the helve 132, 2) the counter grip 138, and 3) the wrist strap 148. Two of the three, the helve 132 and the wrist strap 148, preferably do not intersect a plane defined by the spool 12 or a foot print of the spool 12 (that is, the area below the spool—the counter grip in the embodiments shown intersects a foot print of the spool), providing a wide and stable stance. Among other things, because of the wide stance of the helve 132 and the wrist strap 148—being beyond the spool 12—the safety leash 2 is a very secure leash device for the young, elderly, or the less robust user of any age.

ADDITIONAL EMBODIMENTS: In addition to the embodiments described above, other embodiments for braking the cord 6 of the safety leash 2 are contemplated. An electronic braking system 4 can be made using an actuator that is activated by electric motor and power source. The actuator can either engage a lock 68 to the spool 12 by translating the lock 68 from one position to the other or by rotating the lock 68 on an axis until it finds the engaged position.

The springs 94, 104, 134 disclosed above act as biasing members. Additional springs and spring-like devices, such as a leaf spring, or elastic cable, rubber bands or other materials that store kinetic energy may be used for biasing the spool lock 68 and the helve 132, and winding the spool 12.

The invention illustratively disclosed herein suitably may explicitly be practiced in the absence of any element which is not specifically disclosed herein. While various embodiments of the present invention have been described in detail, it is apparent that various modifications and alterations of those embodiments will occur to and be readily apparent those skilled in the art. However, it is to be expressly understood that such modifications and alterations are within the scope and spirit of the present invention, as set forth in the appended claims. Further, the invention(s) described herein is capable of other embodiments and of being practiced or of being carried out in various other related ways. In addition, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items while only the terms "consisting of" and "consisting only of" are to be construed in the limitative sense.

Wherefore, I claim:

1. A safety leash comprising:
    a wrist mount body;
    a cord supported by the wrist mount body,
    a biased engaged brake for braking the cord;
    a brake release, the brake release including a helve and a counter grip, and the brake release being actuated by moving the helve toward the counter grip, wherein one or more arms extend from the helve to the brake; and
    a spool mount supporting a spool, the spool mount defining a vertical axis that substantially orthogonally intersects a dorsum of a hand of a user when the safety leash is worn by the user;
    wherein, when in use, the spool is mounted on a dorsum of a hand and the helve is held in one of a medial palmer, palmer, and proximal digital region of the hand, and the arms extend between the brake and the helve.

2. The safety leash of claim 1 further comprising a wrist attachment to securely attach the safety leash to one of a wrist, the hand, and a forearm of a user.

3. The safety leash of claim 2 wherein the cord is supported in the spool.

4. The safety leash of claim 3 wherein the spool includes gear teeth and a spool brake brakes the spool.

5. The safety leash of claim 4 wherein the brake includes a catch to catch a gear on the spool to brake the spool.

6. The safety leash of claim 5 further comprising
    the gear teeth being disposed on a first outer circular surface, and the catch is aligned with a median plane which bisects the spool and is perpendicular to the first outer circular surface.

7. The safety leash of claim 3 wherein the spool includes spaced apart first and second gears on respective first and second outer circular surfaces of the spool.

8. The safety leash of claim 7 wherein the brake comprises spaced apart first and second catches, the first and second catches engaging a respective gear tooth on respective first and second gears of the spool.

9. The safety leash of claim 3 wherein the spool is mounted on the spool mount, and one or more rail tracks are defined in the first and second outer circular surface of the spool which engage respective top and base annular rails to allow rotational motion while maintaining a radially fixed position.

10. The safety leash of claim 1 wherein the helve and counter grip are elongate and substantially perpendicular.

11. The safety leash of claim 1 wherein the counter grip is fixed to wrist mount body and the helve is spring biased away from the counter grip.

12. The safety leash of claim 1 wherein the one or more arms are of unitary construction with one or more catches of the brake.

13. The safety leash of claim 1 wherein the wrist mount body mounts on the dorsum of a hand of a user.

14. The safety leash of claim 13 further comprising
a wrist attachment to securely attach the safety leash to one of a wrist, the hand, and a forearm of the user,
the cord being supported in the spool, and
a plane being defined by the spool, which does not intersect the hand of the user when mounted on the hand of the user.

15. The safety leash of claim 14 wherein,
the helve and the counter grip are elongate, and
the helve and the wrist attachment are each radially spaced from the spool.

16. The safety leash of claim 15 further comprising a plurality of helve springs bias the helve away from the counter grip.

17. A safety leash comprising:
a wrist mount body;
a cord supported by the wrist mount body,
a biased engaged brake for braking the cord;
a brake release;
a spool mount supporting a spool, the spool mount defining a vertical axis that substantially orthogonally intersects a dorsum of a hand of a user when the safety leash is worn by the user;
a wrist attachment to securely attach the safety leash to one of a wrist, the hand, and a forearm of a user;
the cord is supported in the spool;
the spool includes gear teeth and a spool brake brakes the spool;
the spool brake includes a catch to catch a gear on the spool to brake the spool;
the gear teeth being disposed on a first outer circular surface;
the catch is aligned with a median plane which bisects the spool and is perpendicular to the first outer circular surface
the spool includes spaced apart first and second gears on respective first and second outer circular surfaces of the spool;
the brake comprising spaced apart first and second catches, the first and second catches engaging a respective gear tooth on respective first and second gears of the spool;
the spool is mounted on the spool mount, and one or more rail tracks are defined in the first and second outer circular surface of the spool which engage respective top and base annular rails to allow rotational motion while maintaining a radially fixed position;
the brake release including a helve and a counter grip;
the helve and counter grip are elongate and substantially perpendicular;
the brake release is actuated by moving the helve toward the counter grip;
the counter grip is fixed to wrist mount body and the helve is spring biased away from the counter grip;
one or more arms extend from the helve to the brake;
the one or more arms are of unitary construction with one or more catches of the brake; and
the wrist mount body mounts on the dorsum of the user;
wherein, when in use, the spool is mounted on a dorsum of the a and the helve is held in one of a medial palmer, palmer, and proximal digital region of the hand, and the arms extend between the brake and the helve.

* * * * *